(12) United States Patent
Matsumoto

(10) Patent No.: US 11,009,113 B2
(45) Date of Patent: May 18, 2021

(54) MANUFACTURING METHOD FOR POWER TRANSMISSION MECHANISM

(71) Applicant: TOYOTA JIDOSHA KABUSHIKI KAISHA, Toyota (JP)

(72) Inventor: Morihiro Matsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 16/168,310

(22) Filed: Oct. 23, 2018

(65) Prior Publication Data

US 2019/0162289 A1 May 30, 2019

(30) Foreign Application Priority Data

Nov. 24, 2017 (JP) .............................. JP2017-226251

(51) Int. Cl.
*F16H 55/22* (2006.01)
*F16H 55/17* (2006.01)
(Continued)

(52) U.S. Cl.
CPC ............. *F16H 55/22* (2013.01); *F16H 48/06* (2013.01); *F16H 48/42* (2013.01); *F16H 55/17* (2013.01); *F16H 57/022* (2013.01); *F16H 57/037* (2013.01); *F16H 2048/382* (2013.01); *F16H 2048/405* (2013.01); *F16H 2048/423* (2013.01); *F16H 2057/0221* (2013.01); *F16H 2057/0225* (2013.01); *F16H 2057/02043* (2013.01)

(58) Field of Classification Search
CPC ........ F16H 55/22; F16H 57/022; F16H 55/17; F16H 48/42; F16H 48/06; F16H 2057/0221; F16H 57/037; F16H 2057/0225; F16H 2057/02043; F16H 2048/423; F16H 2048/382; F16H 2048/405

See application file for complete search history.

(56) References Cited

U.S. PATENT DOCUMENTS 1,898,783 A * 2/1933 Malcolm .............. G03D 13/043
396/623
1,980,237 A * 11/1934 Trbojevich ............ F16H 57/039
74/427

(Continued)

FOREIGN PATENT DOCUMENTS

JP 2008-144787 A 6/2008
JP 2016-056888 A 4/2016

*Primary Examiner* — Lawrence Averick
(74) *Attorney, Agent, or Firm* — Hunton Andrews Kurth LLP

(57) ABSTRACT

A manufacturing method for a power transmission mechanism including: first and second shafts having first and second double helical gears; first and second rolling bearings rotatably supporting the shafts with respect to a case and restrict movement of the shafts in an axial direction thereof, includes an assembling step of assembling an outer ring of the first rolling bearing and an outer ring of the second rolling bearing to the case in a state where the outer rings are movable in the respective axial directions; and a positioning step of determining axial positions of the first rolling bearing and the second rolling bearing while rotating the first shaft and the second shaft in a state where the first double helical gear and the second double helical gear are meshed with each other, after the assembling step.

6 Claims, 7 Drawing Sheets

(51) Int. Cl.
*F16H 48/38* (2012.01)
*F16H 48/42* (2012.01)
*F16H 48/06* (2006.01)
*F16H 57/022* (2012.01)
F16H 48/40 (2012.01)
F16H 57/037 (2012.01)
F16H 57/02 (2012.01)

(56) References Cited

U.S. PATENT DOCUMENTS

| | | | | |
|---|---|---|---|---|
| 2,257,989 | A * | 10/1941 | Sykes | B23F 7/00 451/114 |
| 3,029,661 | A * | 4/1962 | Schmitter | F16H 57/0434 74/606 R |
| 3,885,446 | A * | 5/1975 | Pengilly | F16H 3/095 74/331 |
| 5,083,458 | A * | 1/1992 | DeGeorge | G01M 13/021 33/501.17 |
| 5,807,203 | A * | 9/1998 | Imanishi | F16H 1/08 476/42 |
| 6,334,369 | B1 * | 1/2002 | Sandig | F16H 1/08 74/413 |
| 10,267,357 | B2 * | 4/2019 | Yamauchi | F16C 33/583 |
| 2010/0331139 | A1 * | 12/2010 | McCune | F02C 7/36 475/331 |
| 2012/0108380 | A1 * | 5/2012 | Dinter | F16C 33/1055 475/159 |
| 2013/0053210 | A1 * | 2/2013 | Kari | F16C 41/008 475/331 |
| 2019/0101190 | A1 * | 4/2019 | Takagaki | F16H 1/08 |

* cited by examiner

LEFT SIDE ← AXIAL DIRECTION → RIGHT SIDE

LEFT SIDE ←——→ RIGHT SIDE
AXIAL DIRECTION

AXIAL DIRECTION

LEFT SIDE ←—— AXIAL DIRECTION ——→ RIGHT SIDE

MANUFACTURING METHOD FOR POWER TRANSMISSION MECHANISM

CROSS-REFERENCE TO RELATED APPLICATION(S)

The present application claims priority to and incorporates by reference the entire contents of Japanese Patent Application No. 2017-226251 filed in Japan on Nov. 24, 2017.

BACKGROUND

The present disclosure relates to a manufacturing method for a power transmission mechanism.

Japanese Patent Application No. 2016-56888 A discloses a power transmission mechanism, to be mounted on a vehicle, which includes a final gear pair, using a gear pair of double helical gears meshing with each other, the final gear pair including a final driving gear and a final driven gear (a differential ring gear) which mesh with each other, and the final gear pair includes.

In the gear pair of double helical gears meshing with each other, when there is an error component (meshing error) in a double helical gear, the double helical gears cause single tooth contact and an axial force is generated, at a meshing portion. Since a double helical gear moves in the axial direction by this axial force, an aligning action is generated so that the double helical gears exhibit double tooth contact at the meshing portion. Thus, it is possible to reduce vibrations or noises between the double helical gears compared with those between the spur gears.

Meanwhile, a bearing to support a rotation shaft having a double helical gear is supported in a state in which the rotation shaft is movable in the axial direction so that the aligning action can work at the meshing portion. The axial displacement of the bearing is allowed but alternatively a power transmission efficiency is lowered. Therefore, a structure for supporting a double helical gear by using a highly efficient bearing is conceivable. This highly efficient bearing has a high-power transmission efficiency, but axial displacement of the rotation shaft is not permitted, and, as a result, the axial direction positions of the double helical gears are fixed. For this reason, in order to prevent single tooth contact at the meshing portion and to prevent vibration and noise from occurring, it is necessary to accurately determine an axial position of each double helical gear when assembled. For example, it is conceivable to provide a shim between the bearing and the case to adjust the axial position of the double helical gear in accordance with the thickness of the shim. The shim serves as a member for adjusting the axial position of the double helical gear. However, in this manufacturing method, it is necessary to select a shim of desired thickness from a plurality of shims of different thicknesses prepared in advance to attach the selected shim to the case, so it is not easy to determine an accurate axial position, and the manufacturing process also becomes complicated.

SUMMARY

There is a need for providing a manufacturing method for a power transmission mechanism that facilitates positioning of a double helical gear and simplifies a manufacturing process.

A manufacturing method for a power transmission mechanism is disclosed, the power transmission mechanism including: a first shaft having a first double helical gear; a second shaft having a second double helical gear meshing with the first double helical gear; a first rolling bearing configured to rotatably support the first shaft with respect to a case and restrict a movement of the first shaft in an axial direction thereof; and a second rolling bearing configured to rotatably support the second shaft with respect to the case and restrict a movement of the second shaft in an axial direction thereof. Further the manufacturing method includes: an assembling step of assembling an outer ring of the first rolling bearing and an outer ring of the second rolling bearing to the case in a state where the outer rings are movable in the respective axial directions; and a positioning step of determining axial positions of the first rolling bearing and the second rolling bearing while rotating the first shaft and the second shaft in a state where the first double helical gear and the second double helical gear are meshed with each other, after the assembling step.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, a manufacturing method for a power transmission mechanism according to embodiments of the present disclosure will be specifically described with reference to the accompanied drawings.

First Embodiment

Figure 1:
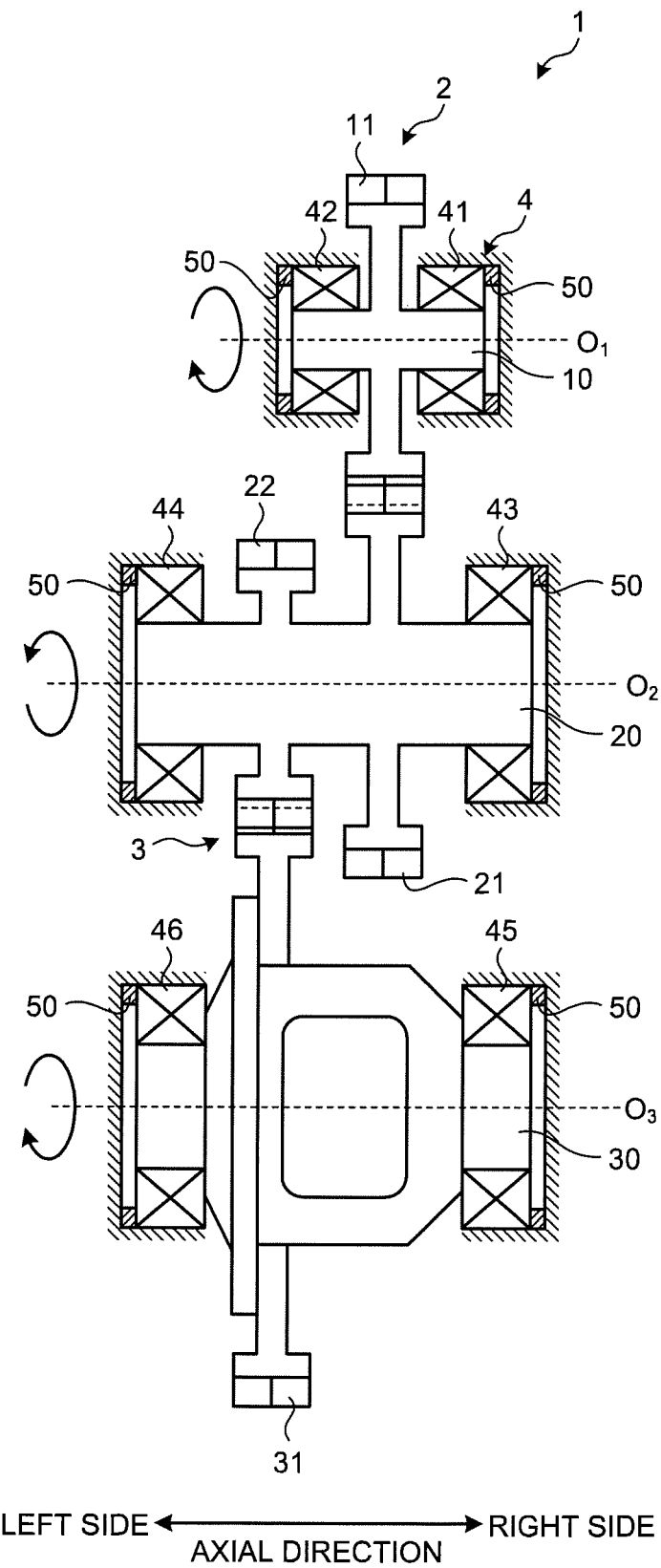
FIG. 1 is a diagram schematically illustrating a power transmission mechanism according to a first embodiment.

FIG. 1 is a diagram schematically illustrating a power transmission mechanism 1 according to a first embodiment. The power transmission mechanism 1 includes a first shaft 10, a second shaft 20, and a third shaft 30, as three rotation shafts arranged in parallel with each other. The first shaft 10 and the second shaft 20 are connected by a first gear pair 2 in a manner that a power can be transmitted. The second shaft 20 and the third shaft 30 are connected by a second gear pair 3 in a manner that a power can be transmitted. The power of the first shaft 10 is transmitted from the first shaft 10 to the third shaft 30 via the second shaft 20. In the description herein, regarding the arrangement in an axial direction, one side in the axial direction is referred to as a right side and the other side in the axial direction is referred to as a left side, as illustrated in FIG. 1. Furthermore, in FIG. 1, $O_1$ refers to a rotation axis of the first shaft 10, $O_2$ refers to a rotation axis of the second shaft 20, and $O_3$ refers to a rotation axis of the third shaft 30.

Specifically, the power transmission mechanism 1 includes the first shaft 10 having a first double helical gear 11, the second shaft 20 having a second double helical gear 21 meshing with the first double helical gear 11, a third double helical gear 22 axially provided on the second shaft 20 to be lined up with the second double helical gear 21, and the third shaft 30 having a fourth double helical gear 31 meshing with the third double helical gear 22. Each of the first to fourth double helical gears 11 and 21, 22, and 31 has a pair of tooth portions (right and left tooth portions) twisted in directions opposite to each other. The first gear pair 2 is a gear pair in which the first double helical gear 11 and the second double helical gear 21 mesh with each other. The second gear pair 3 is a gear pair in which the third double helical gear 22 and the fourth double helical gear 31 mesh with each other. The first gear pair 2 and the second gear pair 3 may have a structure in which the right and left tooth portions are shifted in phase or a structure in which the right and left tooth portions are the same in phase.

The first double helical gear 11 is a gear integrally rotating with the first shaft 10 and is integrated with the first shaft 10 so as not to move relative to the first shaft 10 in an axial direction. The second double helical gear 21 and the third double helical gear 22 are gears integrally rotating with the second shaft 20 and are integrated with the second shaft 20 so as not to move relative to the second shaft 20 in an axial direction. The third double helical gear 22 is a gear having a smaller diameter than that of the second double helical gear 21. The fourth double helical gear 31 is a gear integrally rotating with the third shaft 30 and is integrated with the third shaft 30 so as not to move relative to the third shaft 30 in an axial direction.

In the power transmission mechanism 1 illustrated in FIG. 1, the third shaft 30 is a differential case having a differential mechanism, and the second gear pair 3 is a final gear pair. Specifically, the power transmission mechanism 1 includes the first shaft 10 as an input shaft, the first double helical gear 11 as an output gear, the second double helical gear 21 as a counter driven gear meshing with the output gear, the second shaft 20 as a counter shaft, the third double helical gear 22 as a counter driving gear (a drive pinion gear) meshing with a differential ring gear, the second gear pair 3 as the final gear pair, the third shaft 30 as the differential case, and the fourth double helical gear 31 as the differential ring gear. The fourth double helical gear 31 is integrated with the differential case. As described above, in the power transmission mechanism 1 to be mounted to a vehicle, a part of the differential mechanism can be constituted by the third shaft 30 and the fourth double helical gear 31.

The shafts 10, 20, and 30 are supported by corresponding bearings 41 to 46 so as to be rotated with respect to a case 4. Each of the bearings 41 to 46 includes a rolling bearing (a rolling bearing capable of receiving an axial load in the axis direction of a rotation shaft), such as a ball bearing and a tapered roller bearing, capable of regulating movement of each of the shafts 10, 20, and 30 in the axial direction. As illustrated in FIG. 1, the power transmission mechanism 1 includes the bearings 41 and 42 which are a first rolling bearing rotatably supporting the first shaft 10, and the bearings 43 and 44 which are a second rolling bearing rotatably supporting the second shaft 20, and the bearings 45 and 46 which are a third rolling bearing rotatably supporting the third shaft 30.

The bearings 41 and 42 are attached on both sides of the first shaft 10 in the axial direction. Both of the bearing 41 on the right side and the bearing 42 on the left side include a deep-groove radial bearing, so that each bearing can receive an axial load of the first shaft 10. The bearings 43 and 44 are attached on both sides of the second shaft 20 in the axial direction. Both of the bearing 43 on the right side and the bearing 44 on the left side include a deep-groove radial bearing, so that each bearing can receive an axial load of the second shaft 20. The bearings 45 and 46 are attached on both sides of the third shaft 30 in the axial direction. Both of the bearing 45 on the right side and the bearing 46 on the left side include a deep-groove radial bearing, so that each bearing can receive an axial load of the third shaft 30.

Figure 2:
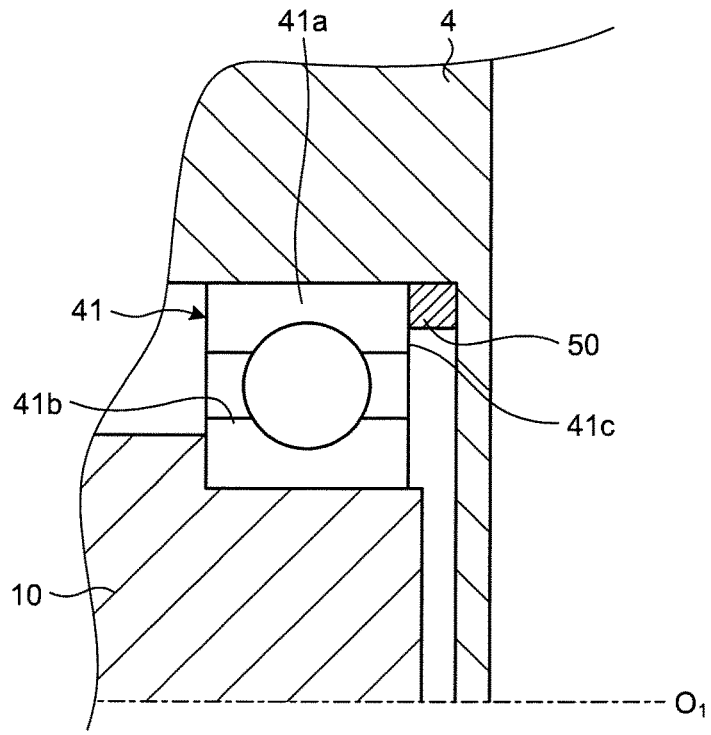
FIG. 2 is a cross-sectional view illustrating a structure in which a resin is cured on a back surface side of an outer ring.

Furthermore, in the axial direction of the respective shafts 10, 20, and 30, a curable resin 50 is cured between back surfaces of outer rings of the respective bearings 41 to 46 and the case 4. Note that the back surface of a bearing (an outer ring) herein refers to an end surface (a surface facing a case wall portion) positioned on one side in the axial direction of an outer ring formed into an annular shape. The curable resin 50 according to the first embodiment is a resin in which a curing agent is mixed (two-liquid mixture resin). The curable resin 50 fixes the outer ring of each of the bearings 41 to 46 to the case 4 so that the outer ring cannot be moved in the axial direction. Here, taking the bearing 41 of FIG. 2 as an example, a structure for fixing the outer ring of the bearing with the curable resin 50 will be described. As illustrated in FIG. 2, the bearing 41 includes an outer ring 41a attached to the case 4 and an inner ring 41b fitted to the first shaft 10. A back surface 41c of the outer ring 41a is fixed to a wall surface of the case 4 with the curable resin 50. The inner ring 41b is in contact with and fitted to a stepped portion of the first shaft 10 so as to receive the axial load from the first shaft 10.

Next, a manufacturing method for the power transmission mechanism 1 will be described with reference to FIG. 3. The manufacturing method according to the first embodiment is a manufacturing method capable of passively positioning a double helical gear to an appropriate meshing position with the curable resin 50. When the bearings 41 to 46 are not particularly distinguished, the bearings are simply described as a bearing.

Figure 3:
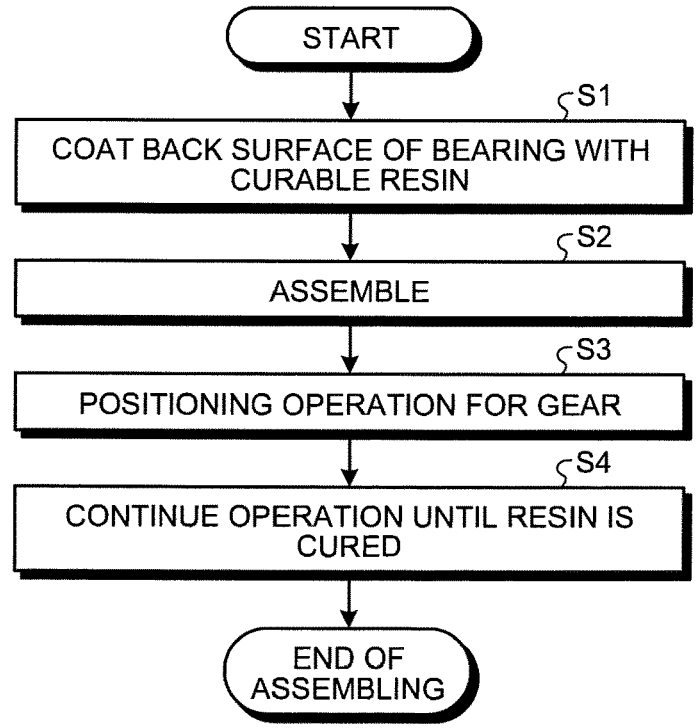
FIG. 3 is a flowchart illustrating a manufacturing method for the power transmission mechanism.

As illustrated in FIG. 3, first, a back surface of a bearing is coated with the curable resin 50 (step S1). In a coating process of step S1, the back surface of the bearing before assembling is coated with the curable resin 50 in a liquid state before curing. For example, a back surface of an outer ring is coated circumferentially annularly with the curable resin 50 before curing.

Then, the bearing coated with the curable resin 50 before curing is assembled to the case 4 in a state in which the bearing is movable in an axial direction (step S2). An assembling process of step S2 includes a process of installing the outer ring of the bearing in the case 4 in a state where the outer ring is movable to the case 4 in the axial direction, and a process of fitting an inner ring of the bearing onto a rotation shaft. In this case, the inner ring is in a fitted state in which the inner ring integrally moves with the rotation shaft in the axial direction. After step S2, the bearing is capable of integrally moving with the rotation shaft in the axial direction and moving relative to the case 4 in the axial direction.

After the assembling process of step S2, a positioning operation for a double helical gear is performed (step S3). The positioning operation herein refers to a process of causing aligning action (centering behavior) at a meshing portion performed by rotating the corresponding rotation shafts in a state where the double helical gears are meshed with each other. By utilizing the axial movement of the double helical gears due to this aligning action, it is possible to passively determine the positions of the double helical gears to an appropriate meshing position. The appropriate meshing position herein refers to an axial position at which double tooth contact is achieved and thrust forces are balanced on both sides in the axial direction.

When the positioning of the first gear pair 2 in the process of step S3 is performed, the first shaft 10 and the second shaft 20 are rotated in a state where the first double helical gear 11 and the second double helical gear 21 are meshed. In the first gear pair 2, the right and left tooth portions of the first double helical gear 11 and the right and left tooth portions of the second double helical gear 21 may be in a single tooth contact depending on an error component (meshing error) of the meshing portion, for example, upon starting rotation. As an example, when the left tooth portions are in contact with each other but the right tooth portions are not in contact with each other, a thrust force acting on the left side in the axial direction is generated at the meshing portion of the first gear pair 2. When the first double helical gear 11 or the second double helical gear 21 moves to the left side in the axial direction due to the thrust force on the left side in the axial direction, the right tooth portions not in contact with each other are brought into contact with each other, and aligning action works to show double tooth contact. In a state of the double tooth contact, a thrust force on the left side in the axial direction caused by the contact between the left teeth portions cancels a thrust force on the right side in the axial direction caused by the contact between the right teeth portions. Therefore, in the meshing portion of the first gear pair 2, the thrust forces acting on the sides opposite to each other in the axial direction are balanced. In this balanced state, the first double helical gear 11 and the second double helical gear 21 do not produce an axial behavior. That is, in a state in which the meshing portion of the first gear pair 2 is aligned, the first shaft 10 and the second shaft 20 do not move in the axial direction.

Therefore, in the process of step S3, the first shaft 10 and the second shaft 20 are rotated, in a state in which the curable resin 50 applied to the back surfaces of the bearings 41 and 42 on the first shaft 10 is not cured and in a state in which the curable resin 50 applied to the back surfaces of the bearings 43 and 44 on the second shaft 20 is not cured. As long as the curable resin 50 is not cured, the respective shafts 10 and 20 are movable in the axial directions, and aligning action works at the meshing portion between the first double helical gear 11 and the second double helical gear 21. Thus, it is possible to optimize an axial position of a double helical gear by using a thrust force (centering behavior). After the end of step S3, when the centering behavior of the respective double helical gears 11 and 21 does not occur before the curable resin 50 is cured, the gears exhibit double tooth contact and are brought into an appropriate meshing state.

Then, the positioning operation is continued until the curable resin 50 is cured (step S4). In the process of step S4, the first shaft 10 and the second shaft 20 continue to rotate until the curable resin 50 is cured. By carrying out the process of step S4, the axial positions of the double helical gears and the axial positions of the bearings are fixed, and the assembly of the double helical gears is completed.

As described above, in the manufacturing method illustrated in FIG. 3, when using a bearing which has high power transmission efficiency and further does not permit axial displacement of a rotation shaft, it is possible to fix the double helical gear having been fixed to an appropriate axial position. Thereby, it is possible to restrain the double helical gears from being fixed to an axial position causing single tooth contact. Furthermore, in the power transmission mechanism 1 having a triaxial structure, the processes of the above-described steps S1 to S4 are also carried out for the bearings 43 and 44 on the second shaft 20 and the bearings 45 and 46 on the third shaft 30 corresponding to the second gear pair 3. In the above-described manufacturing process illustrated in FIG. 3, it is possible to regard the process of step S3 and the process of step S4 as one process, for example, a positioning process (steps S3 to S4). The positioning step is a step of determining axial positions of double helical gears and bearings.

As described above, the manufacturing method according to the first embodiment enables to passively determine a meshing position between double helical gears in accordance with the error component (meshing error). Thus, even though a highly efficient bearing (a rolling bearing that restricts the axial movement of a rotation shaft) is used for a bearing for supporting a double helical gear, the axial position of the double helical gear can be readily determined at a position at which an error component of the gear is to be accommodated, and it is possible to simplify the manufacturing process. In addition to improving efficiency, vibration and noise can be reduced.

Further, in the first embodiment, since the axial position is determined with the curable resin 50, the number of component parts and the weight thereof can be reduced as compared with a structure in which a shim is inserted as in a conventional structure.

It should be noted that the present disclosure is not limited to the above-described first embodiment, and can be appropriately changed and modified without departing from the object of the present disclosure. For example, the power transmission mechanism 1 is not limited to a configuration in which the third shaft 30 is a differential case and the second gear pair 3 is the final gear pair. When the power transmission mechanism 1 is mounted on a vehicle, the present disclosure is also applicable to an electric vehicle using a motor as a drive power source. In this configuration, the first shaft 10 may be an input shaft integrally rotating with a rotor shaft of the motor, the second shaft 20 may be a counter shaft, and the third shaft 30 may be an output shaft. Furthermore, in the power transmission mechanism 1 having a triaxial structure, it is not necessary for all the bearings 41 to 46 to be the same bearing (for example, a deep-groove radial bearing). The bearings 45 and 46 for supporting the third shaft 30 may be a tapered roller bearing or cylindrical roller bearing. Further, the power transmission mechanism 1 is not limited to a triaxial structure, and may be a biaxial structure. That is, the manufacturing method illustrated in FIG. 3 is a manufacturing method applicable to bearings supporting two rotation shafts having a double helical gear pair.

First Modification

Figure 4:
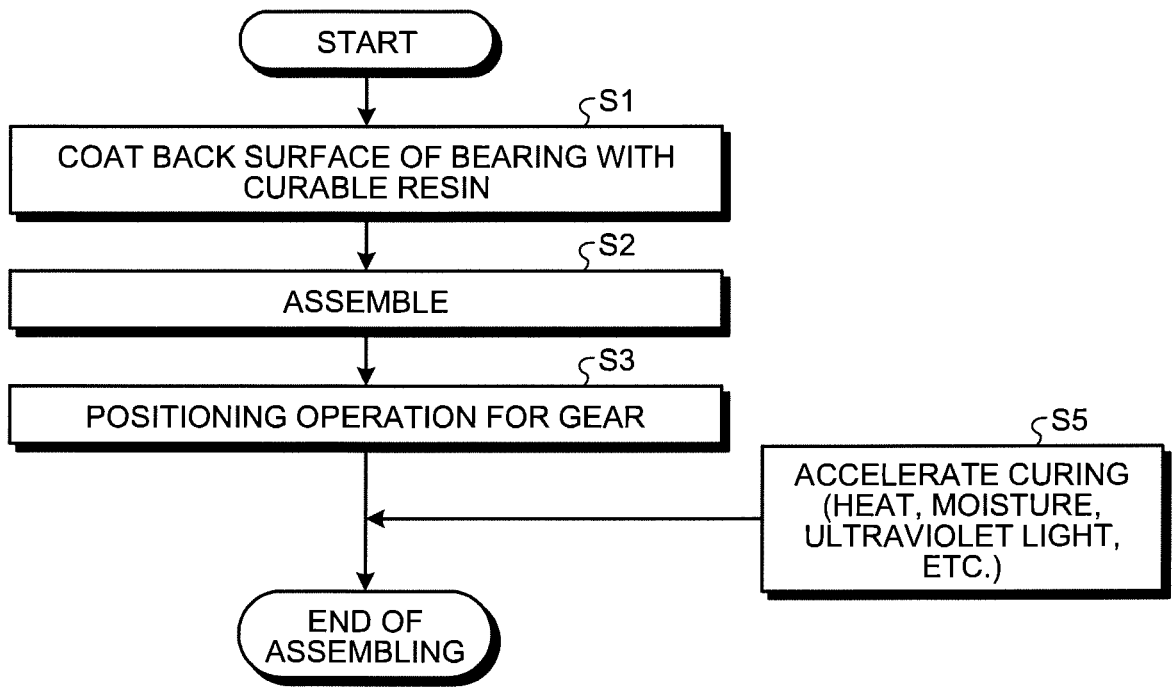
FIG. 4 is a flowchart illustrating a manufacturing method according to a first modification.

As a modification of the first embodiment, the curable resin 50 is not limited to a resin (resin in which a curing agent is mixed) which is cured by being mixed with a curing agent. For example, the curable resin 50 may include a resin (thermosetting resin) which is cured by heating, a resin which is cured by reaction with moisture in the air (moisture curable resin), a resin which is cured by irradiation with ultraviolet light (ultraviolet curable resin) or the like. Alternatively, the curable resin 50 may be a resin which is cured by reaction with air or a metal ion. When such a curable resin 50 is used, a curing accelerating step (step S5 illustrated in FIG. 4) may be included in the manufacturing process. As illustrated in FIG. 4, in the process of step S3, a process of accelerating curing the curable resin 50 is carried out until the resin is cured after the positioning operation for the double helical gear is started (step S5). In the process of step S5, a target curing accelerating action, such as heat, moisture, or ultraviolet light, is given to the resin. The process including steps S3 and S5 illustrated in FIG. 4 is the above-described positioning step, which is a process of continuously rotating a pair of double helical gears until the resin is cured and accelerating a curing reaction of the resin during the process. Note that, after step S3, the process may proceed to step S5 until the curable resin 50 is cured.

Second Modification

Further, as another modification of the first embodiment, the curable resin 50 may be supplied to the back surface of the outer ring of the bearing by using a method other than coating. This second modification will be described with reference to FIGS. 5 to 7. It should be noted that description of the same configuration as that of the first embodiment will be omitted. Further, in the description of FIGS. 6 and 7, the bearings 41 to 46 are collectively referred to as a bearing.

Figure 5:
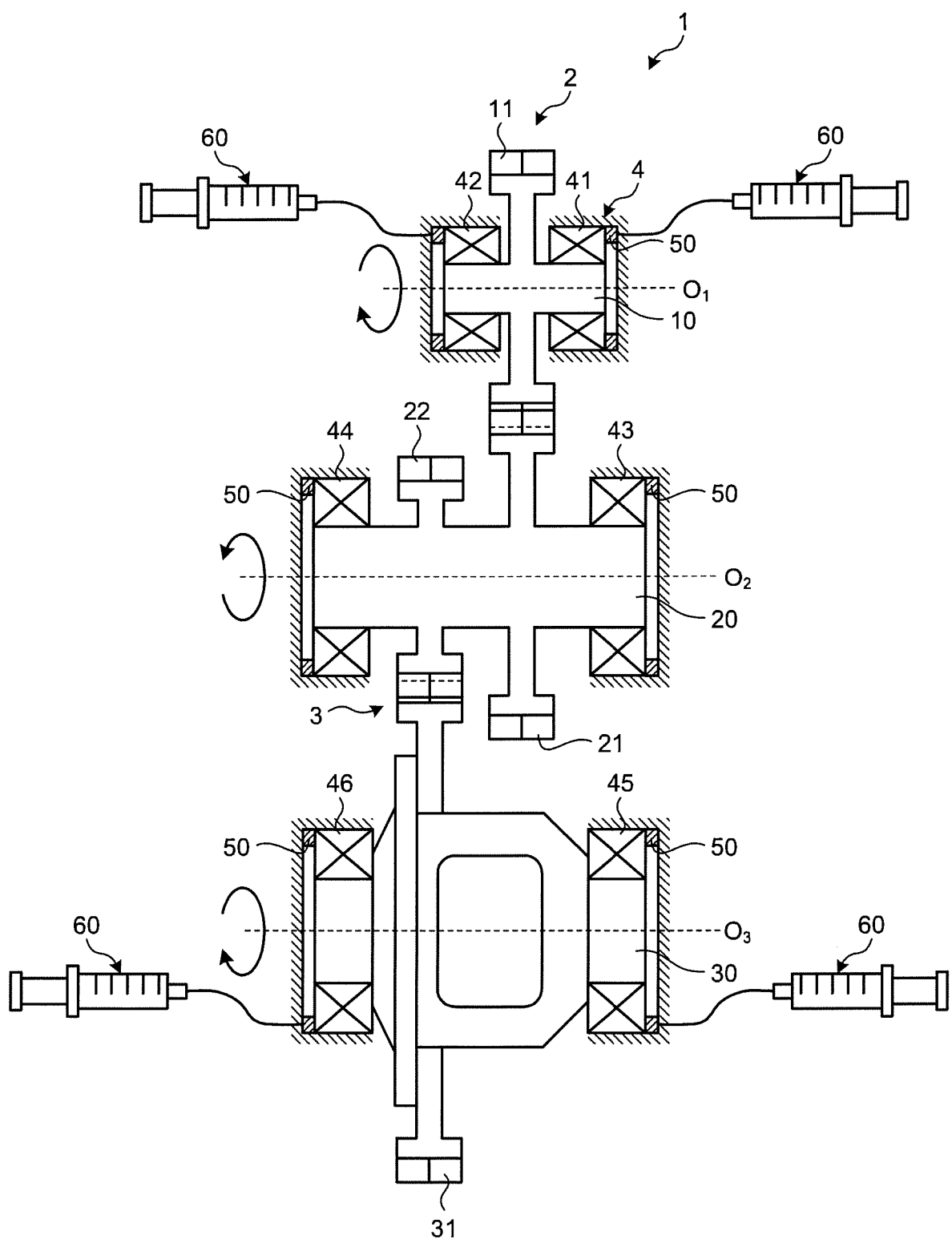
FIG. 5 is a schematic diagram illustrating a manufacturing method according to a second modification.

As illustrated in FIG. 5, after the bearings 41 to 46 are assembled to the case 4, the curable resin 50 is supplied (injected) from outside the case 4 to the back surface side of each of the bearings 41 to 46 by using a supply device such as a syringe 60. In this second modification, a method (illustrated in FIG. 6) of supplying the curable resin 50 from outside the case 4 to the back surface side of the outer ring or a method of supplying a curing agent for the curable resin 50 from outside the case 4 to the back surface side of the outer ring (illustrated in FIG. 7) may be employed.

Figure 6:
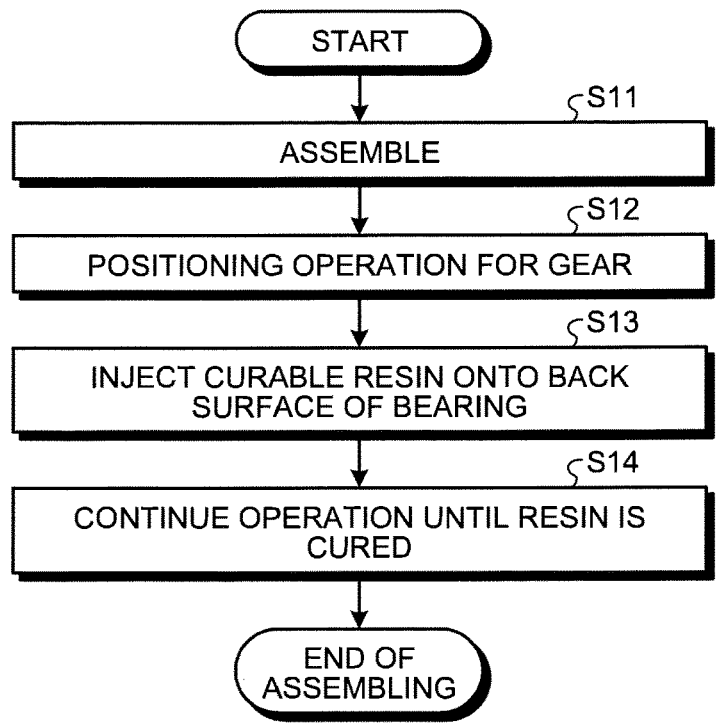
FIG. 6 is a flowchart illustrating the manufacturing method according to the second modification.

As illustrated in FIG. 6, in the manufacturing method of supplying the curable resin 50 from outside the case 4, the bearing is assembled to the case 4 in a state where there is no curable resin 50 on a back surface of an outer ring (step S11). In an assembling process of step S11, the outer ring of the bearing is installed in a state where the outer ring is movable relative to the case 4 in the axial direction. After the assembling process of step S11, the positioning operation for a double helical gear is performed (step S12). During the positioning operation, the curable resin 50 is injected from outside the case 4 into a space between the back surface of the outer ring of the bearing and a wall surface of the case 4 (step S13). The positioning operation for the double helical gear is continued until the curable resin 50 supplied in step S13 is cured (step S14). The manufacturing method illustrated in FIG. 6 is applicable to the curable resin 50 which is a resin in which a curing agent is mixed, and is also applicable to another curable resin. Meanwhile, the manufacturing method illustrated in FIG. 7 is applicable only to the curable resin 50 which is a resin in which a curing agent is mixed.

Figure 7:
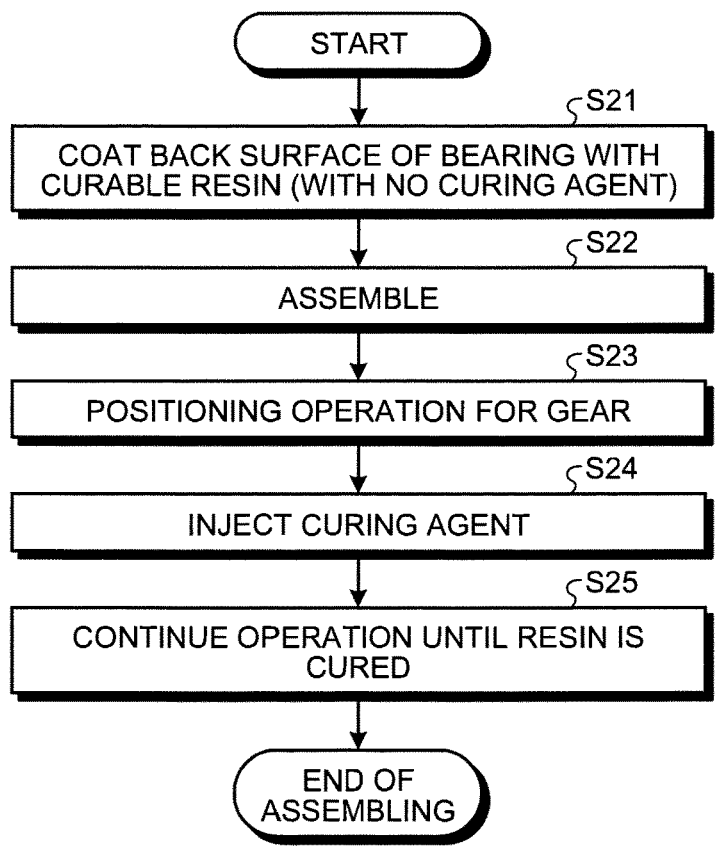
FIG. 7 is a flowchart illustrating another example of the manufacturing method according to the second modification.

As illustrated in FIG. 7, in the manufacturing method of supplying a curing agent from outside the case 4, the back surface of the outer ring of the bearing is coated with an agent, which is a curable resin 50 with no curing agent (step S21). After step S21, the bearing coated with only the agent is assembled to the case 4 (step S22). In an assembling process of step S22, the outer ring of the bearing is installed in a state where the outer ring is movable relative to the case 4 in the axial direction. After the assembling process of step S22, the positioning operation for the double helical gear is performed without the curing agent (step S23). Then, during the positioning operation in step S23, the curing agent is injected from outside the case 4 to the back surface side of the outer ring of the bearing (step S24). In the process of step S24, the applied agent and the injected curing agent react to each other and cure. After step S24, the positioning operation for the double helical gear is continued until the resin is cured (step S25).

As above described in the second modification, it is also possible to employ a manufacturing method of injecting the curable resin 50 to the back surface side of the outer ring after assembling the bearing to the case 4. In the injection process of step S13 in FIG. 6 and in the injection process of step S24 in FIG. 7, it is not always necessary that the curable resin 50 is injected over the entire circumferential direction of the outer ring back surface. For example, a method of injecting the curable resin 50 into at least three places in the circumferential direction of the outer ring may be adopted.

Second Embodiment

Next, a manufacturing method according to a second embodiment will be described with reference to FIGS. 8 to 10. In the second embodiment, unlike the first embodiment, the curable resin 50 is not used and an axial position of a bearing is determined by using a mechanical element. That is, the meshing positions between double helical gears (axial positions of bearings) are defined by the mechanical elements disposed on the back surface side sides of the bearings 41 to 46. In the second embodiment, descriptions of the same elements as those of the above-described first embodiment are omitted, and the same elements are denoted by the same reference numerals. Further, in the description of FIG. 10, the bearings 41 to 46 are collectively referred to as a bearing.

Figure 8:
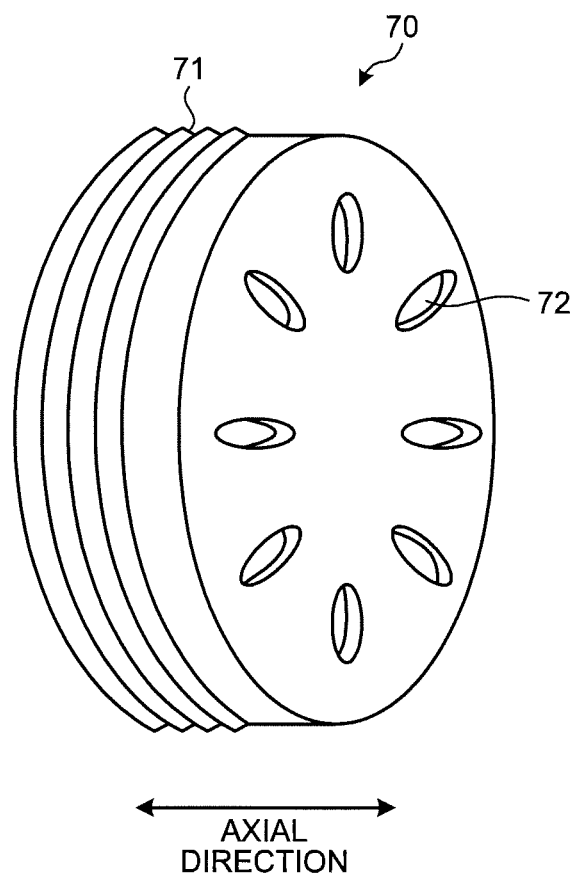
FIG. 8 is a perspective view schematically illustrating a threaded shim used in a second embodiment.

As illustrated in FIG. 8, in the second embodiment, a threaded shim 70 is used as the mechanical element. The threaded shim 70 is a bottomed cylindrical shim having a threaded portion 71 on an outer circumferential portion, and a plurality of recessed portions 72 are provided at intervals in the circumferential direction. Each of the recessed portions 72 is capable of receiving an external force (rotational force) in a rotational direction. For example, a tightening tool is attached to a recessed portion 72, and by rotating this tool, a rotational force is applied to the threaded shim 70, and the threaded portion 71 is threadedly engaged into the case 4.

Figure 9:
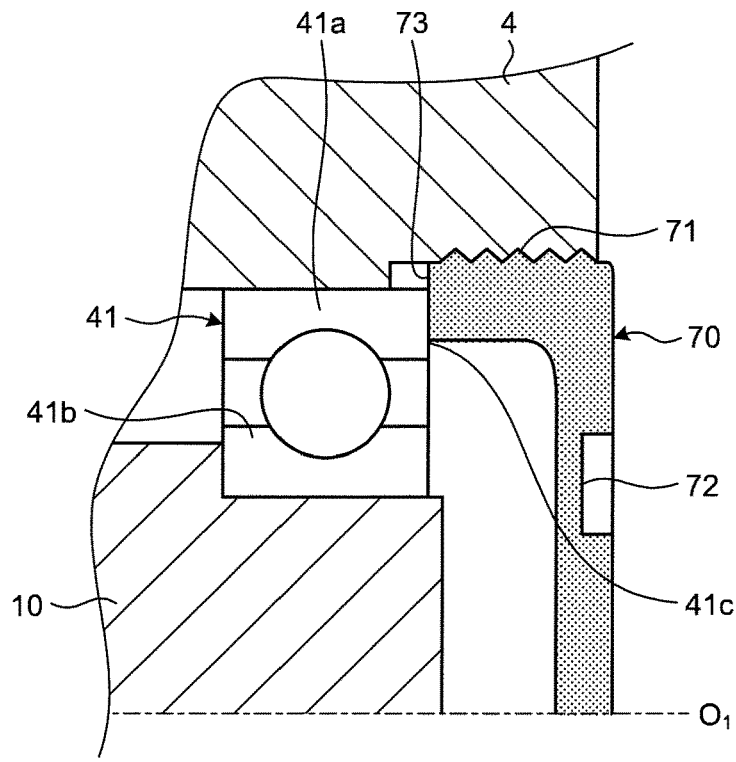
FIG. 9 is a cross-sectional view illustrating a positioning structure according to the second embodiment.

As illustrated in FIG. 9, in the threaded shim 70 in which the threaded portion 71 is threadedly engaged in the case 4, a contact surface 73, which is an axial end surface, is in contact with the back surface 41c of the outer ring 41a. An axial load transferred from the contact surface 73 of the threaded shim 70 acts on the back surface 41c. That is, since the threaded shim 70 that is in contact with the back surface of each bearing is disposed on both sides in the axial direction of each rotation shaft, a load transferred from either side in an axial direction acts on a double helical gear pair. Although the bearing 41 is exemplarily illustrated in FIG. 9, in the power transmission mechanism 1 according to the second embodiment, the threaded shim 70 is provided on the back surfaces of each of the bearings 41 to 46.

Figure 10:
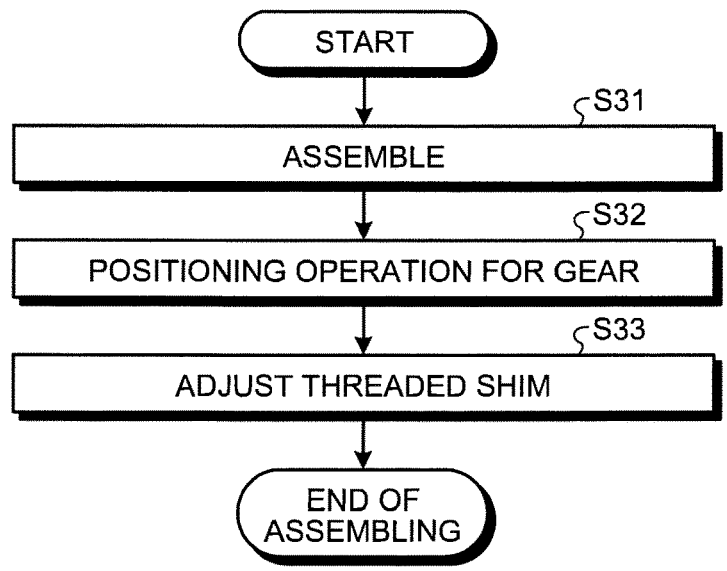
FIG. 10 is a flowchart illustrating a manufacturing method according to the second embodiment.

As illustrated in FIG. 10, in the manufacturing method according to the second embodiment, a bearing is assembled to the case 4 (step S31). After the assembling process of step S31, the positioning operation for a double helical gear is performed (step S32), and a threaded shim 70 is rotated to adjust the axial position thereof (step S33). In this manufacturing method, after the threaded portion 71 is threadedly engaged to the case 4, the threaded shim 70 is rotated so that a meshing position of a double helical gear pair is located at an appropriate position while rotating the double helical gear pair, and the axial position of the bearing is adjusted. For the rotation adjustment of the threaded shim 70, it is possible to use a result of measurement of a condition during the positioning operation in step S32. Examples of measurement items include vibration, noise, axial load and the like. Since the behavior of each measurement item changes when a meshing portion is aligned from single tooth contact to double tooth contact, rotation adjustment of a threaded shim 70 is performed while confirming the change, in the process of step S33.

According to the second embodiment, it is possible to set the meshing position between double helical gears at an appropriate position by using the threaded shim 70. In addition, it is possible to change the axial position of the bearing without replacing component parts (mechanical elements) defining the axial position of the bearing. This eliminates a need for preparing a plurality of shims of different thicknesses, as known in the related art, thereby reducing the number of component parts required for manufacturing. The threaded shim 70 is not limited to the above-mentioned bottomed cylindrical shape, and may be formed in a hollow annular shape.

According to an embodiment of the present disclosure, after coating a back surface of the outer ring with the curable resin, the bearing is assembled to the case, rotating the first shaft and the second shaft, and the position of the meshing portion between double helical gears is passively determined. Thus, the positioning is facilitated, and the manufacturing process can be simplified.

According to an embodiment of the present disclosure, it is possible to supply the curable resin to the back surface of the outer ring after assembling the bearing. This increases the degree of freedom of the manufacturing process.

According to an embodiment of the present disclosure, it is possible to passively determine the axial position of the bearing by utilizing the aligning action occurring at the meshing portion between the double helical gears. This makes it easier to determine the axial position of the bearing during manufacturing.

According to an embodiment of the present disclosure, it is possible to change the axial position of the bearing without changing a mechanical element defining the axial position of the bearing. This eliminates the need for preparing a plurality of shims of different thicknesses, thereby reducing the number of component parts required for manufacturing.

According to an embodiment of the present disclosure, it is possible to change the axial position of the rolling bearing by rotating the threaded shim without replacing component parts.

According to the present disclosure, it is possible to fix a rolling bearing at a meshing position passively determined depending on an error component of a double helical gear. Therefore, even though a rolling bearing restricting the movement of a rotation shaft in an axial direction is adopted, it is easy to determine an axial position of a double helical gear, and the manufacturing process can be simplified.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A manufacturing method for a power transmission mechanism, the power transmission mechanism including:
   a first shaft having a first double helical gear;
   a second shaft having a second double helical gear meshing with the first double helical gear;
   a first rolling bearing configured to rotatably support the first shaft with respect to a case and restrict a movement of the first shaft in an axial direction thereof; and
   a second rolling bearing configured to rotatably support the second shaft with respect to the case and restrict a movement of the second shaft in an axial direction thereof, the manufacturing method comprising:
   an assembling step of assembling outer rings of the first rolling bearing and outer rings of the second rolling bearing to the case in a state where the outer rings are movable in the respective axial directions;
   a positioning step of determining axial positions of the first rolling bearing and the second rolling bearing while rotating the first shaft and the second shaft in a state where the first double helical gear and the second double helical gear are meshed with each other, after the assembling step; and
   a coating step of coating back surfaces of the outer rings with a curable resin, before the assembling step,
   wherein the positioning step includes a curing step of causing the first shaft and the second shaft to continue to rotate until the curable resin is cured between the back surfaces and the case.

2. The manufacturing method for a power transmission mechanism according to claim 1, further comprising
   a supplying step of supplying a curable resin between the back surfaces of the outer rings and the case, after the assembling step,
   wherein the positioning step includes a curing step of causing the first shaft and the second shaft to continue to rotate until the curable resin is cured between the back surfaces and the case.

3. The manufacturing method for a power transmission mechanism according to claim 1, wherein
   in the positioning step, axial positions of the outer rings are displaced by a thrust force generated in a meshing portion between the first double helical gear and the second double helical gear, and the curable resin is cured at the axial positions of the rolling bearings at which the thrust forces are balanced on both sides in the axial directions.

4. The manufacturing method for a power transmission mechanism according to claim 2, wherein
   in the positioning step, axial positions of the outer rings are displaced by a thrust force generated in a meshing portion between the first double helical gear and the second double helical gear, and the curable resin is cured at the axial positions of the rolling bearings at which the thrust forces are balanced on both sides in the axial directions.

5. The manufacturing method for a power transmission mechanism according to claim 1, wherein
   the assembling step includes a thread engagement step of threadedly engaging threaded shims to the case, and the threaded shims have respective contact surfaces making contact with back surfaces of the outer rings, and the positioning step includes an adjustment step of adjusting the axial position of the rolling bearings by rotating the threaded shims while rotating the first shaft and the second shaft.

6. The manufacturing method for a power transmission mechanism according to claim 5, wherein in the positioning step, the threaded shims are rotated to set the axial positions of the rolling bearings to positions at which thrust forces generated at a meshing portion between the first double helical gear and the second double helical gear are balanced on both sides in the axial directions.

* * * * *